United States Patent [19]

Cassel

[11] 3,730,293
[45] May 1, 1973

[54] EXHAUST PIPE WITH COMBINED BENDABLE PARTITION

[76] Inventor: Thomas R. Cassel, 226 Shirley, Birmingham, Mich.

[22] Filed: May 12, 1972

[21] Appl. No.: 254,355

[52] U.S. Cl. .................... 181/36 B, 181/48, 181/59
[51] Int. Cl. ........................ F01n 1/02, F01n 7/18
[58] Field of Search ............... 181/36 B, 35 B, 35 C, 181/48, 44, 46, 59, 63

[56] References Cited

UNITED STATES PATENTS

| | | | |
|---|---|---|---|
| 2,651,381 | 9/1953 | Cooper | 181/36 B UX |
| 3,104,736 | 9/1963 | Ludlow et al. | 181/36 B UX |
| 3,429,397 | 2/1969 | Case | 181/36 B UX |

FOREIGN PATENTS OR APPLICATIONS

| | | | |
|---|---|---|---|
| 319,626 | 9/1929 | Great Britain | 181/36 B |

Primary Examiner—Richard B. Wilkinson
Assistant Examiner—John F. Gonzales
Attorney—Paul J. Ethington et al.

[57] ABSTRACT

An improved exhaust pipe partition structure is disclosed for use in forming sound attenuating and thermal insulating devices inside the pipe. The partition is of sheetlike construction and extends from wall to wall of the pipe to separate the space inside the pipe into a through passage for conducting the exhaust gases and a chamber which is closed at least at one end to inhibit the flow of gas therethrough. In the improved construction the partition is held in position inside the pipe by two oppositely disposed rows of indentations in the walls of the pipe. The sheet is comprised of a plurality of longitudinally disposed zones and alternate zones are more easily yieldable to forces tending to bend the partition in its own plane so that the pipe, with the partition in place, may be bent in any direction without undue distortion of the pipe or the partition.

10 Claims, 6 Drawing Figures

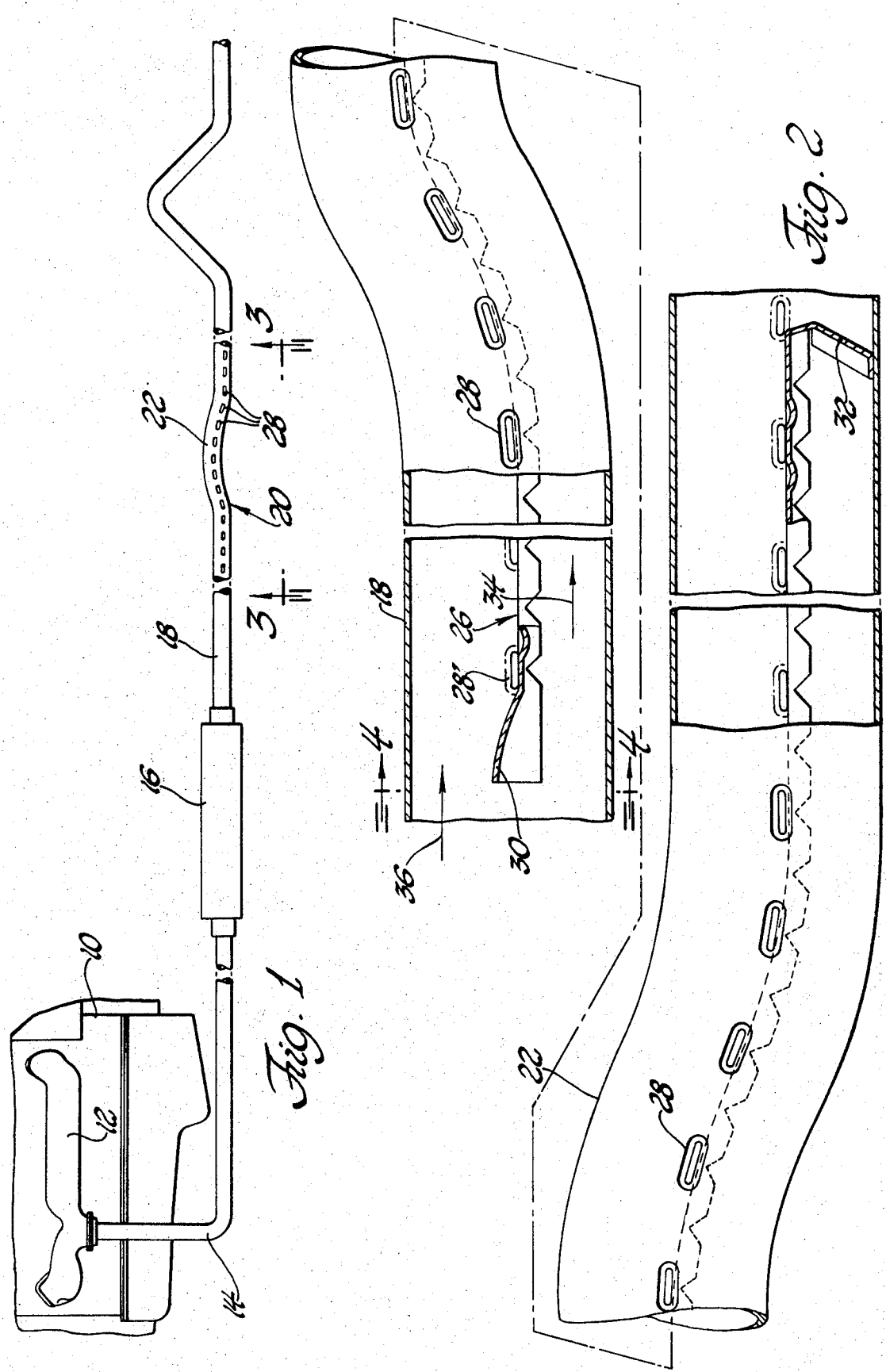

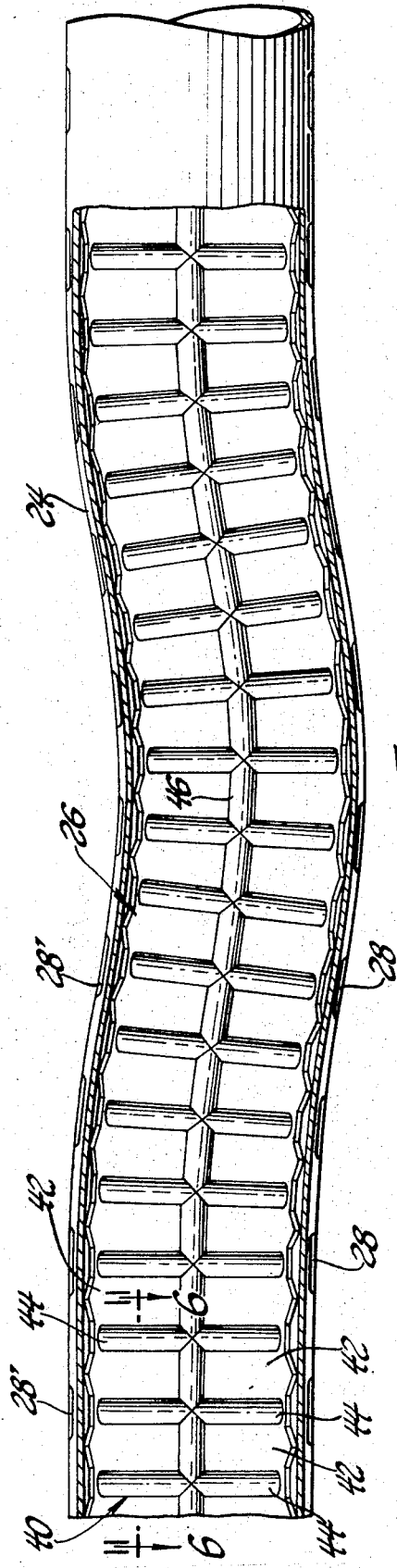
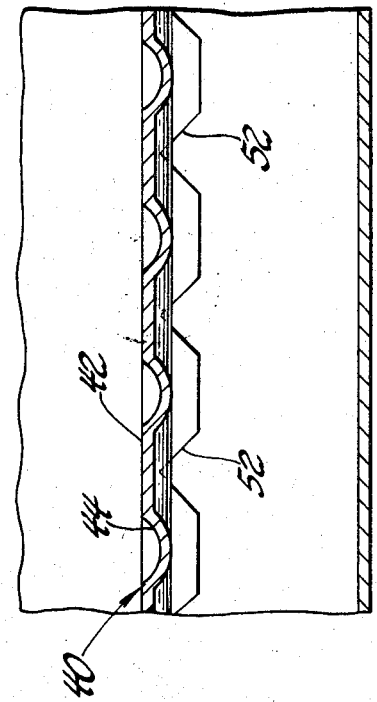
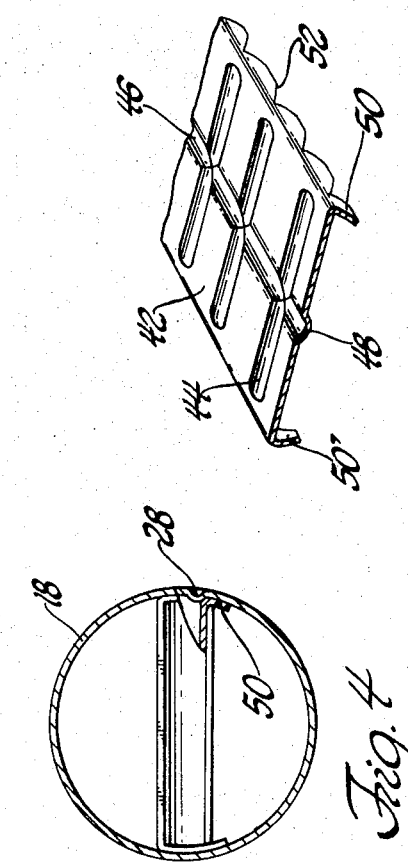

EXHAUST PIPE WITH COMBINED BENDABLE PARTITION

This invention relates to vehicle exhaust systems and more particularly to an exhaust conduit provided with an internal partition.

In automotive vehicle engine exhaust systems there are many applications in which it is desirable to provide a partition in a conduit adapted for conducting the hot exhaust gases from the engine exhaust manifold through sound attenuating devices to the atmosphere. Such a partition may be utilized for different functions in the design of the system, such as, for example, a quarter wave tuner as disclosed and claimed in my U.S. Pat. No. 3,645,357 granted Feb. 29, 1972. Such a partition may also be used for forming resonant chambers, such as the Helmholtz resonator and for forming expansion chambers acoustically coupled with the gas stream for sound attenuation purposes. In certain high temperature exhaust systems, for example those that are designed for use with catalytic converters, it is often desirable to provide thermal insulation from the high temperature gas stream. For this purpose a partition within the exhaust pipe may be used to establish a thermal barrier over selected portions of the pipe. Such a partition may be substantially closed to the flow of gases and, if desired for a particular installation, communication may be provided through the wall of the partition to provide acoustical coupling in a desired mode of sound attenuation.

In many vehicle installations, because of space limitations beneath the body of the vehicle, it is necessary for the exhaust pipe to be bent into a configuration dictated by the clearance space under the vehicle. Consequently, it is not uncommon for the exhaust pipe to be curved in the horizontal plane or in the vertical plane and in some cases the pipe must be provided with a compound curvature, i.e. components in both the horizontal and vertical planes. The requirement for bending or curvature of the exhaust pipe has heretofore militated against the free use of internal partitions in the design of the exhaust system. The sound attenuating structure disclosed and claimed in the aforementioned U.S. Pat. No. 3,645,357 is adapted to accommodate bends in the exhaust pipe in a plane perpendicular to the plane of the partition; however, it will not withstand bending of the pipe in the plane of the partition without distortion of the partition or disruption of the engagement thereof with the pipe. Furthermore, there has been some difficulty in bending of the pipe when the partition is held in place by a continuous or lengthy indentation in the wall of the pipe in that the pipe tends to collapse or is severely distorted at cross section by the bending operation. Accordingly, there has been a need for improvement of the retaining means for holding the partition in place within the pipe without rigid connection thereof, i.e. retaining means which will allow a small degree of relative slippage during bending to avoid undue distortion and during heating and cooling to minimize the "popdown" noises in the system.

In accordance with the present invention an improved pipe partition structure is provided which permits any selected portion of an exhaust pipe to be partitioned and to be bent in any desired plane without distortion of the partition. Such a bendable pipe partition structure may be used for sound attenuation purposes or thermal insulating purposes or a combination of the two. This is accomplished by a sheetlike partition extending axially of the pipe and extending transversely from wall to wall with its opposite edges in contact with the walls. The partition separates the space inside the pipe with a first portion being open at both ends and providing a through passage for the flow of hot exhaust gases. The second portion is substantially closed at least at one end to inhibit the flow of exhaust gases therethrough and the other end may be open or closed depending upon the function of the partition. The partition is formed of a unitary sheet of material, preferably sheet steel which includes a plurality of longitudinally disposed zones with alternate zones being more easily yieldable to forces applied in the plane of the partition than the remaining zones, so that bending forces applied to the pipe for bending it in the plane of the partition causes the alternate zones to yield and bending of the partition will occur without rupture of the sheet or distortion of the plane of the partition. To permit relative slippage between the pipe and partition during bending the edges of the partition are maintained in slidable frictional engagement with the walls of the pipe. The retaining structure for the partition in the pipe includes rows of spaced indentations extending longitudinally of the pipe on opposite sides thereof and the partition is disposed on one side of the rows of indentations, preferably in a wedgelike relationship with the walls of the pipe. The partition is preferably provided with lateral flanges along the edges thereof in contact with the walls of the pipe and provided with spaced notches. This construction permits bending of the pipe and the partition in a plane perpendicular to the plane of the partition without distorting the partition or the cross sectional shape of the pipe. In a preferred embodiment the unitary sheet forming the partition is provided with multiple corrugations extending transversely of the pipe and with at least one corrugation extending longitudinally near the center line of the partition.

A more complete understanding of the invention and the advantages thereof may be obtained from the detailed description that follows taken with the accompanying drawings in which:

FIG. 1 is the side elevation view of an automotive vehicle exhaust system including the invention;

FIG. 2 is an enlarged sectional view of a portion of an exhaust gas pipe including the subject invention;

FIG. 3 is a fragmentary view taken on lines 3—3 of FIG. 1 showing details of the bendable partition of the subject invention;

FIG. 4 is a sectional view of the exhaust pipe and partition taken on lines 4—4 of FIG. 2;

FIG. 5 is a perspective view of the portion of the bendable partition; and

FIG. 6 is an enlarged fragmentary view taken on lines 6—6 of FIG. 3 and showing further details of the bendable partition.

Referring now to the drawings, there is shown an illustrative embodiment of the invention in a quarter wave tuner in an exhaust pipe of an automotive vehicle. As shown in FIG. 1, the vehicle includes an internal combustion engine 10 provided with an exhaust manifold 12, from which the exhaust gases are conveyed to the rear of the vehicle for discharge to the atmosphere. For this purpose the exhaust system includes an exhaust pipe 14 which extends downwardly to a point below the vehicle body and thence rearwardly to a muffler 16 which attenuates the sound level of the exhaust gases. The outlet end of the muffler 16 is connected through another exhaust pipe 18 (commonly referred to as a tailpipe) to a discharge point at the rear of the vehicle where the exhaust gases are discharged to the atmosphere. In order to augment the sound attenuation provided by the muffler 16, particularly for selected lower frequencies, a quarter wave tuner 20 is incorporated in the exhaust pipe 18 in a structure which constitutes an exemplary embodiment of the present invention.

The use of a quarter wave tuner in automotive exhaust systems is well known and, as set forth in the aforementioned U.S. Pat. No. 3,645,357, such a tuner may be formed by a sheet-like partition in the exhaust pipe. In order to provide for attenuating of a selected band of sound wave frequencies the quarter wave tuner defines a column closed at one end and open at the other and having a length which is equal to one-fourth of the wavelength of the center frequency of the band to be attenuated. Additionally, the tuner is positioned within the exhaust pipe with the open end or mouth of the tuner upstream of the gas flow at a location which coincides with a pressure point of the sound wave of the frequency to be attenuated. The closed end of the tuner in the downstream position need not be formed with a fluid tight seal; in fact if the closed end has a leak area which does not exceed 10 percent of the cross sectional area of the tuner column, it is quite acceptable. In many installations an opening or leak area is purposely provided in the closed end of the tuner because it has the effect of broadening the band width of the frequencies which are attenuated.

In many vehicle installations of exhaust systems it is necessary for the exhaust pipe to be bent or curved to avoid obstructions on the underbody of the vehicle. Such bends may be required to have components of curvature in both the horizontal and vertical planes in order to follow the optimum route to the rear of the vehicle. In view of the requirement for placement of the quarter wave tuner at a pressure point, as mentioned above, the desired placement may coincide with a portion of the exhaust pipe which is formed with a bend of either a simple or compound or curvature. In the fabrication of the exhaust pipe with an incorporated quarter wave tuner, it is desirable to insert the tuner structure at the desired location in the pipe before the bending operation is performed. Accordingly it is necessary that the tuner structure, including the ancillary portion of the pipe, be capable of being bent with curvature of relatively small radius in any plane without undue distortion of the pipe or the tuner structure.

Referring now to FIG. 1 and FIG. 3, it is noted that the placement of the tuner 20 includes a portion of the pipe 18 which is provided with a bend or curve 22 in the vertical plane and with a bend or curve 24 in the horizontal plane. As shown in FIGS. 2 and 3, the tuner structure comprises a partition 26 of sheetlike construction suitably of preformed sheet metal, such as a conventional cold rolled steel as is commonly used in the construction of exhaust system components, such as mufflers and the like. Alternatively, for exhaust systems of the high temperature type such as those employing a catalytic converter, the partition may be formed of a high temperature material such as stainless steel. It is noted that the partition is formed of a unitary sheet of material and is retained in position within the pipe 18 by means of the row of indentations 28 and the oppositely disposed row of indentations 28, each indentation being formed with an inwardly directed protuberance. The partition 26 extends axially of the pipe from an upstream end which is suitably formed with a flared open end or mouth 30 to provide an enlarged cross sectional mouth area for the intake of sound energy from the exhaust gas, while the cross sectional area of the column proper may be reduced to minimize the back pressure in the pipe. The partition 26 terminates at the downstream end in a transversely extending tab 32 integral with the partition. The transverse location of the partition 26 is determined by the placement of the two rows of indentations 28 and 28' relative to the longitudinal axis of the pipe. The partition 26 is of such width that it may be inserted into the pipe 18 by axial sliding motion with a frictional fit against the walls thereof, as will be described in more detail subsequently. It is noted that the partition 26 divides the space in the pipe 18 into the closed end tuner column denoted by the arrow 34 and into the through passage denoted by the arrow 36. The through passage 36 is of course open at both ends and is adapted to conduct the hot exhaust gas flow therethrough for discharge to the atmosphere.

In order that the partition 26, being formed of a unitary sheet of metal of relatively heavy gauge, may be bent in compound curvature and particularly in the plane of the partition itself, it is provided with a special structural configuration. As shown in FIGS. 3, 5 and 6, the metal sheet of the partition includes multiple corrugations extending transversely of the pipe and partition. Adjacent corrugations may be regarded as comprising a ridge or zone 42 constituted of a portion of the undeformed sheet metal of which the partition is constructed and a groove or zone 44 in the form of a relatively narrow transverse band of reduced cross section formed into a trough or crease. Consequently, alternate zones, i.e. zones 44, are of modified structure compared to the remaining zones 42 and are more easily yieldable to forces applied in the plane of the partition, which tend to bend the partition in its own plane. The partition is also provided with a longitudinally extending corrugation 46, preferably at or near the center line of the partition. The corrugation 46 is formed with a trough or crease 48 of reduced cross sectional thickness relative to the adjacent zones 42. Consequently, the crease 48 is more easily yieldable to forces in the plane of the partition tending to bend the partition in its own plane and this yieldability promotes the bending about this corrugation as a neutral axis. In the preferred embodiment of the invention as illustrated in the drawings, the partition 26 is formed with the multiple transversely extending corrugations and the longitudinally extending corrugation by means of roll-forming of the sheet metal.

The partition 26 is also provided at its opposite edges with laterally extending flanges 50 and 50'. The flanges are an integral part of the partition and are provided with multiple, axially spaced notches 52, suitably of V shape. The flanges 50 and 50', as shown in FIG. 4, form a seating surface for retaining the partition 26 in position relative to the walls of the pipe 18 and the indentations 28. As mentioned above, the partition 26 is inserted into the pipe 18 prior to bending thereof and the edges of the partition, including the flanges 50 and 50' are in slidable frictional engagement with the walls of the pipe. Further, it is noted, that the flanges 50 and 50' form an acute angle with the plane of the partition and conform to the pipe walls so that the partition is wedgingly engaged at the juncture of the pipe walls and the inwardly directed protuberance of the indentations 28 and 28'. The notches 52 facilitate the bending of the partition in a direction perpendicular to its own plane without rupturing or distorting the partition. As alluded to above, the indentations 28 in the row on one side of the pipe and the indentations 28' in the row on the other side of the pipe are formed as discrete indentations in the pipe wall and are axially spaced. The axial spacing is small enough to provide adequate support for the partition 26 but is large enough to prevent collapse or undue distortion of the pipe 22 when it is bent in a plane perpendicular to the partition.

In the construction provided by the invention, the partition 26 may be inserted into the desired portion of the pipe prior to any bending operation and will be retained in position by the spaced indentations 28 and 28'. By reason of the slidable frictional engagement between the edges of the partition and the walls of the pipe relative slippage may occur during the pipe bending operation without undue distortion or deformation of the partition. It is understood, of course, that the bending operation may be performed by conventional pipe bending processes. The partition 26, by reason of its special construction including longitudinally disposed zones, alternate ones of which are relatively yieldable to forces in the plane of the partition, is bendable in the plane of the partition without rupture or gross deformation of the partition. When the pipe is bent in the plane of the partition the zones 44 will tend to be contracted by folding in the thin material of the crease on the inside of the bend, whereas the zones 44 will stretch or elongate by leveling out in the thin portion of the crease at the outer side of the bend, with a neutral axis extending along the longitudinal corrugation 46. When the pipe is bent in a plane perpendicular to the partition 26 the partition will readily flex with the bending of the pipe and retain its position by virtue of the indentations 28. The flanges 50 and 50' will accommodate the bending by closing or opening of the notches 52, depending upon the direction of the bend. A combination of these effects is achieved to facilitate the bending of the pipe in a compound curvature, i.e. with a component in the plane of the partition and a component perpendicular to the partition.

Although the description of this invention has been given with reference to a particular embodiment thereof, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. For use in an engine exhaust gas conduit of the type which includes a pipe adapted to conduct hot exhaust gases, a sheetlike partition extending axially of said pipe, said partition extending transversely from wall to wall of said pipe and having its opposite edges in contact therewith and separating the space inside said pipe into first and second portions, said first portion being open at both ends and constituting a through passage for the hot exhaust gases, said second portion being substantially closed at least at one end to inhibit the flow of exhaust gases therethrough, the improvement comprising said partition being a unitary sheet of material, said sheet including a plurality of longitudinally disposed zones, alternate ones of said zones being more easily yieldable to forces applied in the plane of said partition than the remaining one of said zones whereby, upon application of forces tending to bend said partition in its own plane, said alternate ones of said zones will yield preferentially and the bending will occur without rupture of said sheet or distortion of the plane of the partition.

2. The invention as defined in claim 1 wherein said pipe is provided with oppositely disposed rows of spaced indentations in the wall of the pipe, said rows extending axially of the pipe and defining the plane of location of said partition, said partition being disposed with the edges thereof in engagement with the respective rows of indentations and on the same sides thereof.

3. The invention as defined in claim 2 wherein said unitary sheet of material is provided with a laterally extending flange at each edge thereof, each of said flanges defining a plurality of notches whereby said pipe and said partition may be bent in a plane perpendicular to the plane of the partition without distortion of the plane of said flanges.

4. The invention as defined in claim 3 wherein said alternate ones of said zones includes transversely extending creases in said material.

5. The invention as defined in claim 3 wherein said longitudinally disposed zones comprise a plurality of transversely extending corrugations and said sheet including an axially extending corrugation disposed near the center line of said sheet.

6. A conduit for engine exhaust gases comprising a pipe of circular cross section, a partition extending axially of said pipe, said partition comprising a unitary sheet of metal extending transversely from wall to wall of said pipe having its opposite edges in frictional engagement therewith and separating the space inside the pipe into first and second portions, said first portion being open at both ends and adapted to conduct exhaust gases therethrough, said second portion being substantially closed at least at one end to inhibit the flow of gases therethrough, said pipe having a pair of oppositely disposed rows of spaced indentations in the wall thereof, said rows extending axially of the pipe and defining the plane of location of said partition, said partition being disposed with the edges thereof in engagement with the respective rows of indentations and on the same sides thereof, said unitary sheet of metal being provided with a laterally extending flange at each edge thereof, each of said flanges defining a plurality of notches whereby said pipe and said partition may be bent in a plane perpendicular to the plane of the partition without collapse of said pipe or distortion of the plane of said flanges.

7. The invention as defined in claim 6 wherein said partition is provided with multiple corrugations extending transversely of said pipe and with at least one corrugation extending longitudinally of said pipe, said pipe and said partition being curved in a plane parallel to the plane of said partition.

8. For use in a sound attenuating system, a quarter wave tuner of the type including a pipe adapted to be connected with a gas stream and a source of sound energy producing a plurality of pressure points therein, an edge-bounded sheetlike partition extending axially of said pipe from one of said pressure points and having a length approximately equal to one-fourth the wavelength of the sound energy producing the pressure point, said partition extending transversely from wall to wall of said pipe and having its opposite edges in contact therewith and separating the space inside said pipe into first and second axially extending passages, said partition defining a terminal end portion substantially closing the first of said passages at one end and defining an inlet portion of the first of said passages at the other end thereby forming a quarter wave tuner, the other of said passages being open at both ends for the flow of said gas stream therethrough, the improvement comprising said partition being a unitary sheet of metal, said sheet including a plurality of longitudinally disposed zones, alternate ones of said zones being more easily yieldable to forces applied in plane of the partition than the remaining ones of said zones whereby, upon the application of forces tending to bend said partition in its own plane, said alternate ones of said zones will yield preferentially and the bending will occur without rupture of said sheet or distortion of the plane of the partition.

9. The invention as defined in claim 8 wherein said pipe is provided with oppositely disposed rows of spaced indentations in the wall of the pipe, said rows extending axially of the pipe and defining the plane of location of said partition, said partition being disposed with the edge thereof in engagement with the respective rows of indentations and on the same sides thereof.

10. The invention as defined in claim 9 wherein said unitary sheet of material is provided with a laterally extending flange at each edge thereof, each of said flanges defining a plurality of notches whereby said pipe and said partition may be bent in a plane perpendicular to the plane of the partition without distortion of the plane of said flanges.

* * * * *